(12) United States Patent
Dimotakis

(10) Patent No.: US 9,075,289 B2
(45) Date of Patent: *Jul. 7, 2015

(54) ROLL-TILT BALL TURRET CAMERA HAVING COILED DATA TRANSMISSION CABLE

(71) Applicant: Aerovironment, Inc., Monrovia, CA (US)

(72) Inventor: Manolis Pavlos Dimotakis, Altadena, CA (US)

(73) Assignee: AeroVironment, Inc., Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,720

(22) Filed: Aug. 15, 2013

(65) Prior Publication Data

US 2014/0161435 A1   Jun. 12, 2014

Related U.S. Application Data

(63) Continuation of application No. 13/220,565, filed on Aug. 29, 2011, now Pat. No. 8,523,462.

(51) Int. Cl.
  *G03B 17/56*   (2006.01)
  *G03B 15/00*   (2006.01)
  *F16M 11/12*   (2006.01)
  *F16M 11/18*   (2006.01)
  (Continued)

(52) U.S. Cl.
  CPC .............. *G03B 17/561* (2013.01); *F16M 11/12* (2013.01); *F16M 11/18* (2013.01); *F16M 11/04* (2013.01); *F16M 11/10* (2013.01); *G03B 15/006* (2013.01)

(58) Field of Classification Search
  CPC ...................................................... G03B 17/56

USPC .......................................................... 396/428
See application file for complete search history.

(56) References Cited

U.S. PATENT DOCUMENTS 3,638,502 A * 2/1972 Leavitt et al. .................. 74/5.34
4,217,606 A * 8/1980 Nordmann ..................... 348/151
(Continued)

FOREIGN PATENT DOCUMENTS

CN   201099352 Y   8/2008
CN   101766049 A   6/2010
(Continued)

OTHER PUBLICATIONS

Office Action in U.S. Appl. No. 13/220,197, mailed Nov. 7, 2013.
(Continued)

*Primary Examiner* — Clayton E Laballe
*Assistant Examiner* — Kevin Butler
(74) *Attorney, Agent, or Firm* — Nixon Peabody LLP; Eric Aagaard

(57) ABSTRACT

In one embodiment, a ball turret assembly for supporting a camera includes a first shaft rotatable about a first axis relative to a first fixed point, the first shaft having an axially-extending interior region in communication with an exterior of the first shaft by way of a first exit port. A first guide disposed at least partially circumferentially on the first shaft proximally to the first exit port is provided, and a cable extends along the interior region of the first shaft and exits the first shaft at the first exit port, the cable looping at least partially around the first shaft and affixed at the first fixed point.

10 Claims, 5 Drawing Sheets

(51) Int. Cl.
  *F16M 11/04* (2006.01)
  *F16M 11/10* (2006.01)

(56) References Cited

U.S. PATENT DOCUMENTS

| | | | | |
|---|---|---|---|---|
| 5,153,623 | A | * | 10/1992 | Bouvier ............... 396/427 |
| 5,251,118 | A | * | 10/1993 | Budnovitch et al. ......... 362/362 |
| 5,383,645 | A | * | 1/1995 | Pedut et al. ............... 248/637 |
| 5,897,223 | A | * | 4/1999 | Tritchew et al. ........... 396/13 |
| 5,936,245 | A | | 8/1999 | Goillot et al. |
| 6,056,237 | A | * | 5/2000 | Woodland ............... 244/3.15 |
| 6,147,701 | A | * | 11/2000 | Tamura et al. ............. 348/36 |
| 6,226,125 | B1 | * | 5/2001 | Levy et al. ............... 359/618 |
| 6,628,338 | B1 | * | 9/2003 | Elberbaum et al. ........... 348/373 |
| 7,000,883 | B2 | * | 2/2006 | Mercadal et al. ............. 248/660 |
| 7,058,721 | B1 | * | 6/2006 | Ellison et al. ............... 709/231 |
| 7,695,647 | B2 | * | 4/2010 | Smela et al. ............... 252/512 |
| 7,747,364 | B2 | * | 6/2010 | Roy et al. ............... 701/28 |
| 7,955,006 | B1 | * | 6/2011 | Harvey ............... 396/428 |
| 8,091,833 | B2 | * | 1/2012 | von Flotow et al. ........... 244/131 |
| 8,137,007 | B1 | * | 3/2012 | Harvey ............... 396/427 |
| 8,140,200 | B2 | * | 3/2012 | Heppe et al. ............. 701/16 |
| 8,174,612 | B1 | * | 5/2012 | Koehler ............... 348/373 |
| D662,120 | S | * | 6/2012 | Deurwaarder ............... D16/203 |
| 8,226,039 | B2 | * | 7/2012 | von Flotow et al. ........... 244/131 |
| D668,701 | S | * | 10/2012 | Ohno et al. ............... D16/219 |
| 8,523,462 | B2 | | 9/2013 | Dimotakis |
| 8,559,801 | B2 | | 10/2013 | Dimotakis |
| 2004/0026573 | A1 | * | 2/2004 | Andersson et al. ........... 244/183 |
| 2004/0173726 | A1 | * | 9/2004 | Mercadal et al. ............. 248/660 |
| 2004/0230352 | A1 | * | 11/2004 | Monroe ............... 701/3 |
| 2005/0219639 | A1 | | 10/2005 | Fujise et al. |
| 2006/0016966 | A1 | * | 1/2006 | Hughes et al. ............. 250/221 |
| 2006/0033288 | A1 | * | 2/2006 | Hughes et al. ............. 277/412 |
| 2006/0110155 | A1 | * | 5/2006 | Kouchi et al. ............... 396/419 |
| 2006/0231675 | A1 | * | 10/2006 | Bostan ............... 244/12.1 |
| 2007/0031151 | A1 | | 2/2007 | Cunningham et al. |
| 2008/0215204 | A1 | | 9/2008 | Roy et al. |
| 2008/0267612 | A1 | * | 10/2008 | Harvey ............... 396/428 |
| 2008/0277631 | A1 | | 11/2008 | Smela et al. |
| 2009/0015674 | A1 | | 1/2009 | Alley et al. |
| 2009/0216394 | A1 | * | 8/2009 | Heppe et al. ............. 701/16 |
| 2009/0218447 | A1 | * | 9/2009 | von Flotow et al. ........... 244/131 |
| 2009/0273671 | A1 | | 11/2009 | Gardner |
| 2009/0284644 | A1 | * | 11/2009 | McKaughan et al. ........ 348/348 |
| 2010/0141503 | A1 | * | 6/2010 | Baumatz ............... 342/27 |
| 2010/0241931 | A1 | * | 9/2010 | Choi et al. ............... 714/776 |
| 2010/0265329 | A1 | | 10/2010 | Doneker |
| 2010/0309344 | A1 | * | 12/2010 | Zimmer et al. ............. 348/242 |
| 2011/0103021 | A1 | * | 5/2011 | Janssen et al. ............. 361/714 |
| 2012/0104169 | A1 | * | 5/2012 | von Flotow et al. ........... 244/131 |
| 2012/0106800 | A1 | * | 5/2012 | Khan et al. ............... 382/104 |
| 2012/0200703 | A1 | | 8/2012 | Nadir et al. |
| 2012/0320203 | A1 | | 12/2012 | Liu |
| 2013/0048792 | A1 | * | 2/2013 | Szarek et al. ............... 244/175 |
| 2013/0050486 | A1 | | 2/2013 | Omer et al. |
| 2013/0050487 | A1 | | 2/2013 | Omer et al. |
| 2013/0051778 | A1 | | 2/2013 | Dimotakis |
| 2013/0051782 | A1 | | 2/2013 | Dimotakis |
| 2013/0135471 | A1 | | 5/2013 | Giuffrida et al. |

FOREIGN PATENT DOCUMENTS

| | | |
|---|---|---|
| TW | 211058 | 8/1993 |
| WO | WO 2013/074172 A2 | 5/2013 |
| WO | WO 2013/074173 A2 | 5/2013 |
| WO | WO 2013/074175 A1 | 5/2013 |
| WO | WO 2013/074176 A1 | 5/2013 |
| WO | WO 2013/074177 A2 | 5/2013 |

OTHER PUBLICATIONS

Final Office Action in U.S. Appl. No. 13/220,197, mailed Jun. 2, 2014.
Office Action in U.S. Appl. No. 13/220,535, mailed Aug. 2, 2013.
Final Office Action in U.S. Appl. No. 13/220,535, mailed Feb. 27, 2014.
Final Office Action in U.S. Appl. No. 13/220,535, mailed Aug. 1, 2014.
Office Action in U.S. Appl. No. 13/220,535, mailed Dec. 2, 2014.
Office Action in U.S. Appl. No. 13/220,562, mailed Nov. 23, 2012.
Notice of Allowance in U.S. Appl. No. 13/220,562, mailed May 1, 2013.
Office Action in U.S. Appl. No. 13/220,617, mailed Dec. 4, 2012.
Notice of Allowance in U.S. Appl. No. 13/220,617, mailed Jun. 10, 2013.
Office Action in U.S. Appl. No. 13/220,619, mailed Dec. 9, 2013 (restriction).
Office Action in U.S. Appl. No. 13/220,619, mailed May 13, 2014.
Final Office Action in U.S. Appl. No. 13/220,619, mailed Oct. 8, 2014.
PCT International Search Report and Written Opinion in International Application No. PCT/US12/52723, mailed May 3, 2013.
PCT International Search Report and Written Opinion in International Application No. PCT/US12/52725, mailed May 3, 2013.
PCT International Search Report and Written Opinion in International Application No. PCT/US12/52729, mailed on May 13, 2013.
PCT International Search Report and Written Opinion in International Application No. PCT/US12/52728, mailed Mar. 19, 2013.
PCT International Search Report and Written Opinion in International Application No. PCT/US12/52727, mailed Mar. 18, 2013.
Office Action and Search Report in Taiwanese Application No. 101130829, dated May 14, 2014.
Office Action in Taiwanese Application No. 101130829, dated Sep. 29, 2014.
Office Action and Search Report in Taiwanese Application No. 101130830 dated Oct. 30, 2014.
Office Action and Search Report in Taiwanese Application No. 101130828, dated Nov. 11, 2014.
Notice of Allowance for U.S. Appl. No. 13/220,619, mailed Mar. 6, 2015.
Office Action and Search Report in TW Application No. 101130827 dated Feb. 12, 2015, 14 pages.

* cited by examiner

ROLL-TILT BALL TURRET CAMERA HAVING COILED DATA TRANSMISSION CABLE

CROSS-REFERENCE TO RELATED APPLICATIONS

This application is a continuation of U.S. patent application Ser. No. 13/220,562, filed Aug. 29, 2011, and titled ROLL-TILT BALL TURRET CAMERA HAVING COILED DATA TRANSMISSION CABLE, the entire disclosure of which is incorporated by reference herein.

TECHNICAL FIELD

The present disclosure relates generally to camera-equipped aircraft, for example unmanned aerial vehicles used for surveillance.

BACKGROUND

Unmanned aerial vehicles, or UAVs, are invaluable tools for intelligence gathering because they are pilotless and reduce exposure and risk to human life during their operation. They find application above battle fields and in other hazardous environments, and can be fitted with information-gathering equipment such as cameras configured to acquire images of the terrain below. The images can be video or still and can be stored for subsequent retrieval, or transmitted in real-time to a remote home station for storage or analysis.

Typically, the UAV-mounted camera is disposed in a gimbaled turret below the fuselage of the camera. The turret is movable by a remote operator having radio frequency (RF) communication with the UAV, its flight controls, and its various equipment, including the camera. Moving the gimbaled turret, with its camera, enables the operator to concentrate attention on a particular area of interest, for example to capture higher resolution images of the area of interest, or to scan over a broad region in order to pick up any activity that warrants greater scrutiny, either in real time or during subsequent analysis of the images.

OVERVIEW

As described herein, a ball turret assembly for supporting a camera. The ball turret assembly includes a first shaft rotatable about a first axis relative to a first fixed point, the first shaft having an axially-extending interior region in communication with an exterior of the first shaft by way of a first exit port. The ball turret assembly also includes a first guide disposed at least partially circumferentially on the first shaft proximally to the first exit port, and a cable extending along the interior region of the first shaft and exiting the first shaft at the first exit port, the cable looping at least partially around the first shaft and affixed at the first fixed point.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a roll-tilt ball turret camera having coiled data transmission cable. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The term "exemplary" is used exclusively herein to mean "serving as an example, instance or illustration." Any embodiment described herein as "exemplary" is not necessarily to be construed as preferred or advantageous over other embodiments.

Figure 1A:
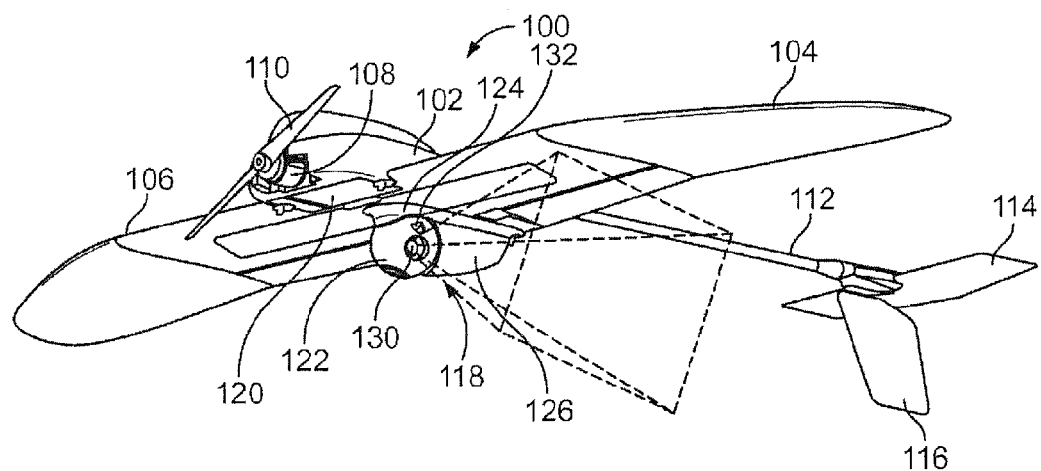
FIGS. 1A and 1B are perspective views of an unmanned surveillance aircraft having an example ball turret assembly.
Figure 1B:
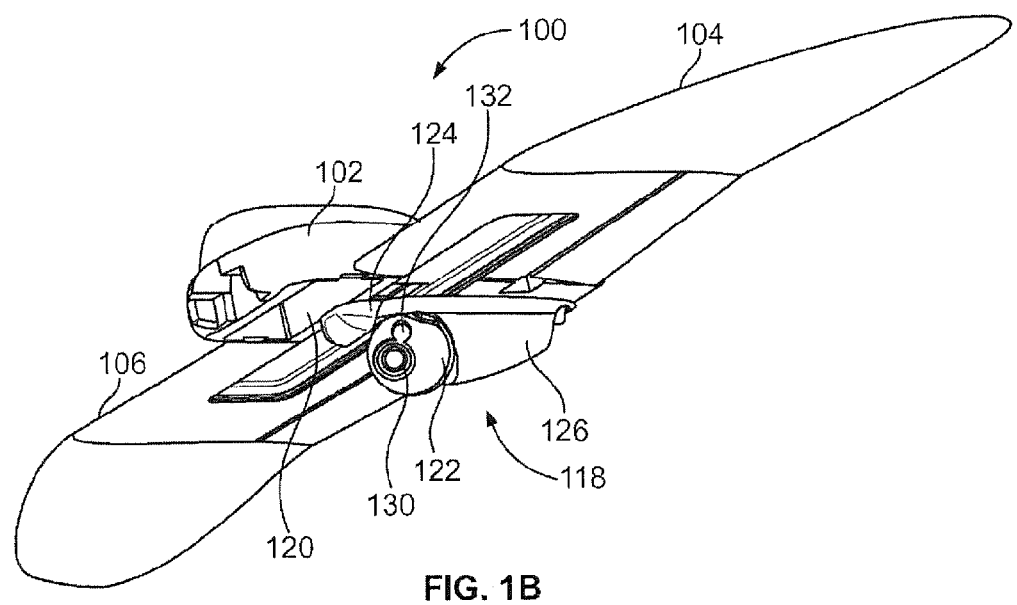

FIGS. 1A and 1B are perspective views of an unmanned reconnaissance aircraft 100. The aircraft 100 has a fuselage 102 mounting a left wing 104 and a right wing 106. The aircraft 100 is powered by an engine 108 which rotates a propeller 110. The aircraft 100 is stabilized with the assistance of elevators 114 and a tail 116 mounted on a boom 112. In this example, the aircraft 100 is small enough to be carried by an individual soldier and has a top speed of about 55 knots and a cruising speed of about 25 knots. Of course, the principles described herein may be applied to larger or smaller aircraft that are faster or slower than the example aircraft 100 in FIG. 1.

The aircraft 100 includes a ball turret assembly 118 that is suspended from an under surface 120 of the fuselage 102. The ball turret assembly 118 includes a ball turret 122 that is mounted in a housing 124 on the under surface 120. The ball turret 122 is mounted in front of a fairing 126 that is also part of the housing 124. In this example, the ball turret 122 holds an infrared camera 130 and a color camera 132. In this example, the infrared camera 130 may be a MicroTau 320 or 640 model camera available from FLIR and the color camera is a 5 megapixel Model MT9P031 EO sensor. Both cameras are configured for taking approximately 30 frames per second video stream of images but may also send still images at higher resolution. Of course other types of cameras and/or sensors may be mounted in the ball turret 122. The ball turret 122 is rotated by a yoke which is mounted on the fairing 126. As will be explained below, the fairing 126 in combination with the ball turret assembly 118 reduces drag because the yoke is behind the ball turret 122. By actuators for tilting and rolling the ball turret 122, the cameras 130 and 132 may be directed toward areas under the under surface 120 of the fuselage 102. As shown in FIG. 1A, the ball turret has been rotated to point the cameras 130 and 132 to the left side of the aircraft 100. FIG. 1A shows an approximate imaging area that may be viewed by the cameras 130 and 132 in this position. FIG. 1B shows the ball turret 122 rotated to position the cameras 130 and 132 to view an area to the front of the aircraft 100.

Figure 2A:
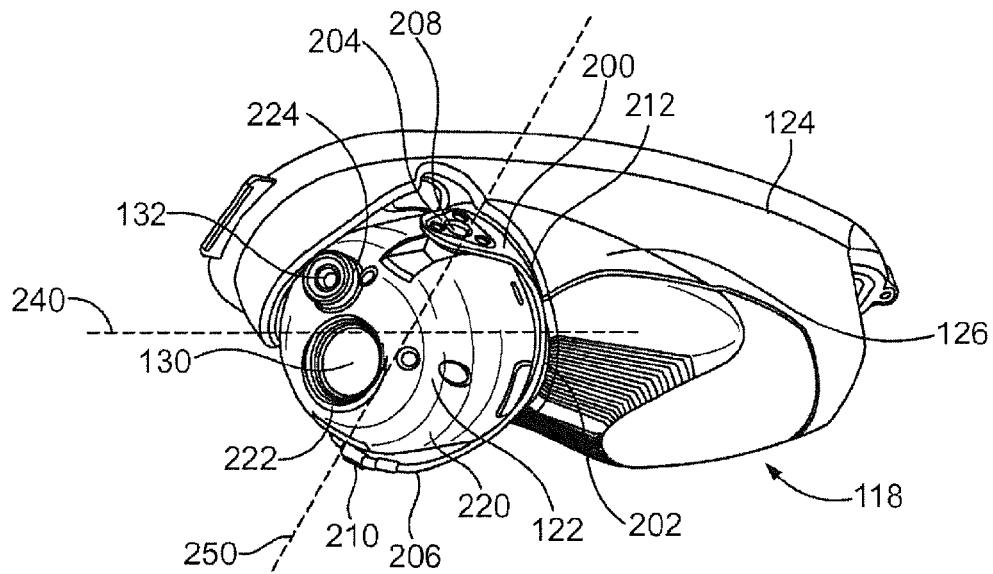
FIG. 2A is close up perspective view of the example ball turret assembly mounted on the aircraft of FIG. 1.
Figure 2B:
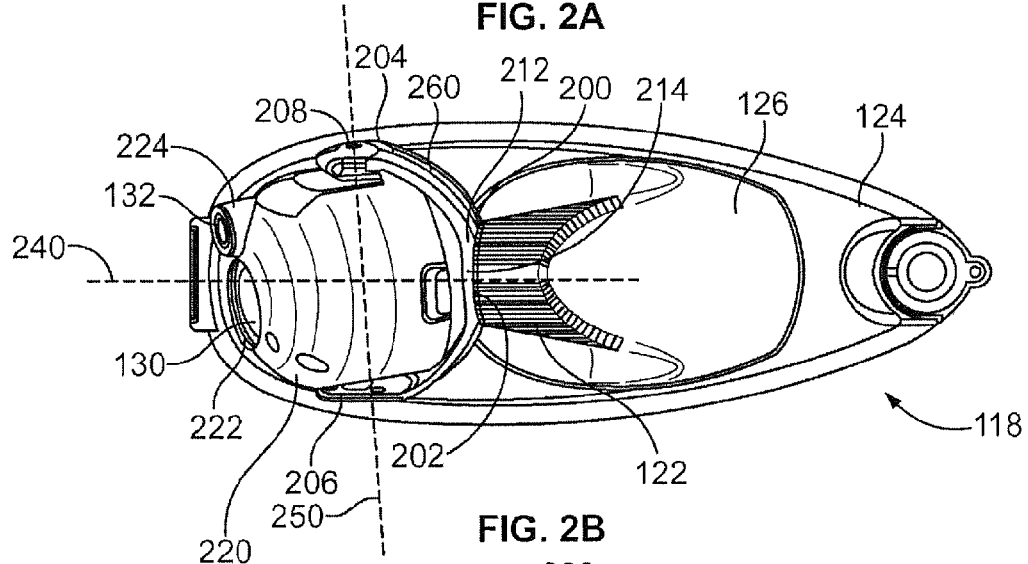
FIG. 2B is a bottom view of the example ball turret assembly in FIG. 2A.
Figure 2C:
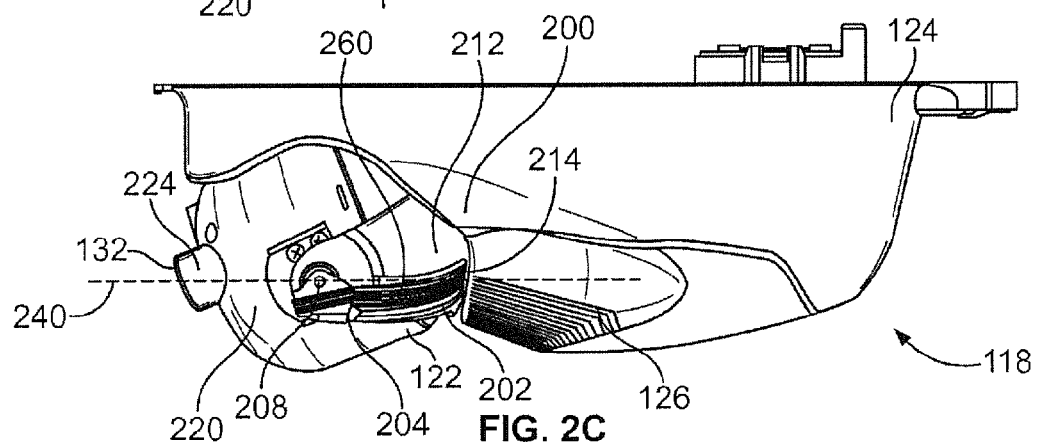
FIG. 2C is a side view of the example ball turret assembly in FIG. 2A.
Figure 2D:
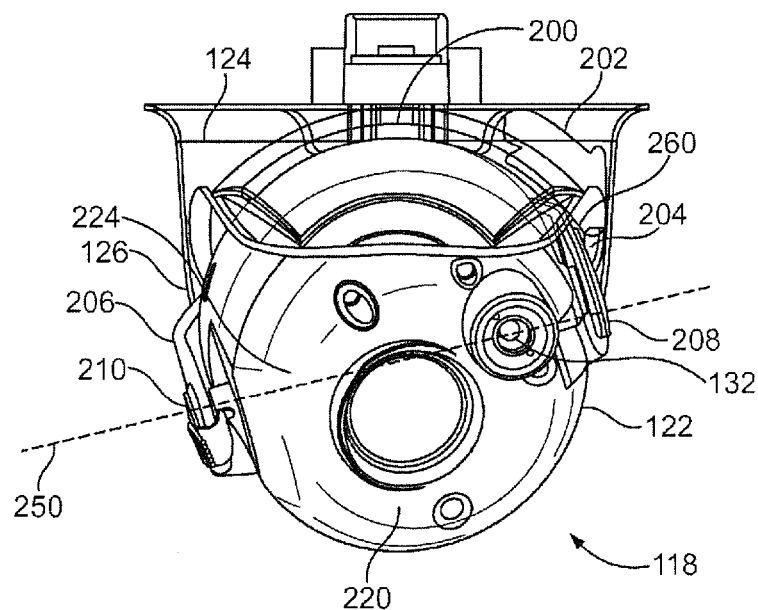
FIG. 2D is a front view of the example ball turret assembly in FIG. 2A.
Figure 2E:
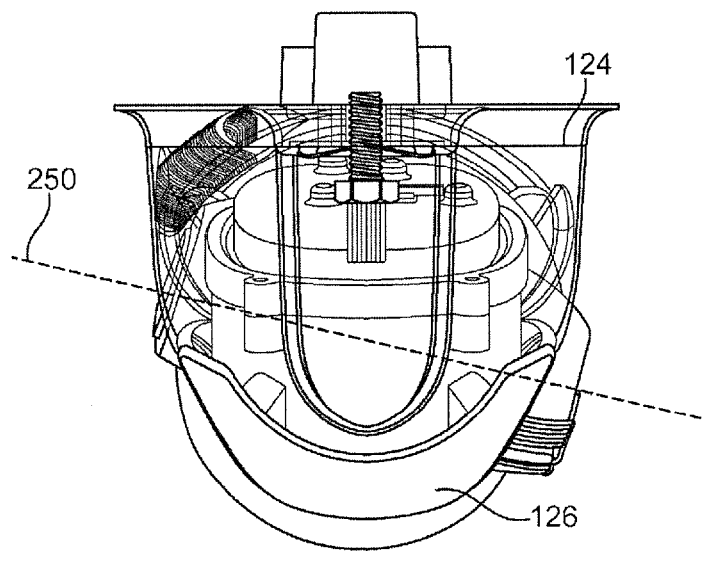
FIG. 2E is a rear view of the example ball turret assembly in FIG. 2A.

FIGS. 2A-2E are close up views of the example ball turret assembly 118 in FIG. 1. FIG. 2A is close up perspective view of the example ball turret assembly 118, FIG. 2B is a bottom view of the example ball turret assembly 118, FIG. 2C is a side view of the example ball turret assembly 118, FIG. 2D is a front view of the example ball turret assembly 118 and FIG. 2E is a rear view of the example ball turret assembly 118. The ball turret assembly 118 includes the ball turret 122 mounted on the fairing 126 on the under surface 120 of FIG. 1 via a gimbal assembly 200. A yoke 202 extends from the fairing 126. The yoke 202 includes a pair of forks 204 and 206 that have ends that hold the ball turret 122 via pins 208 and 210. The forks 204 and 206 have respective opposite ends from the pins 208 and 210 connected by a cross bar 212. The cross bar 212 is attached to a roll drive shaft 214 that supports the yoke 202 from the fairing 126. The ball turret 122 includes an exterior surface 220 that is water proof and sealed to protect the mechanical and electrical components such as the cameras 130 and 132 stored therein. Since the yoke 202 does not have any actuating or electronic components the number of parts requiring water-proofing is also decreased. The exterior surface 220 has an aperture 222 for the infrared camera 130 and a mounting cylinder 224 for the color camera 132.

A roll axis is represented by a dashed line 240 which points forward relative to the aircraft 100. As will be explained the ball turret 122 may be rotated around the roll axis 240 via the roll drive shaft 214 being rotated by a roll actuator in the fairing 126. A tilt axis represented by a dashed line 250 is 90 degrees offset from the roll axis 240. The ball turret 122 is therefore rotated on the forks 204 and 206 around the tilt axis 250 via a tilt actuator contained in the turret 122. A wiring harness 260 containing wiring for power, data and communications extends from the fairing 126 to the ball turret 122 through the interior of the drive shaft 214 and is attached to the yoke 202 and follows the fork 204 to the interior of the ball turret 122. In one embodiment, the range of rotation of the roll drive shaft 214 about roll axis 240 is almost a complete circle, or 360 degrees, although this not intended to be limited and rotations greater than 360 degrees are contemplated. In a more preferable embodiment, the range of rotation of the roll drive shaft 214 about roll axis 240 is less than a complete circle, and is about 270 degrees.

Figure 3:
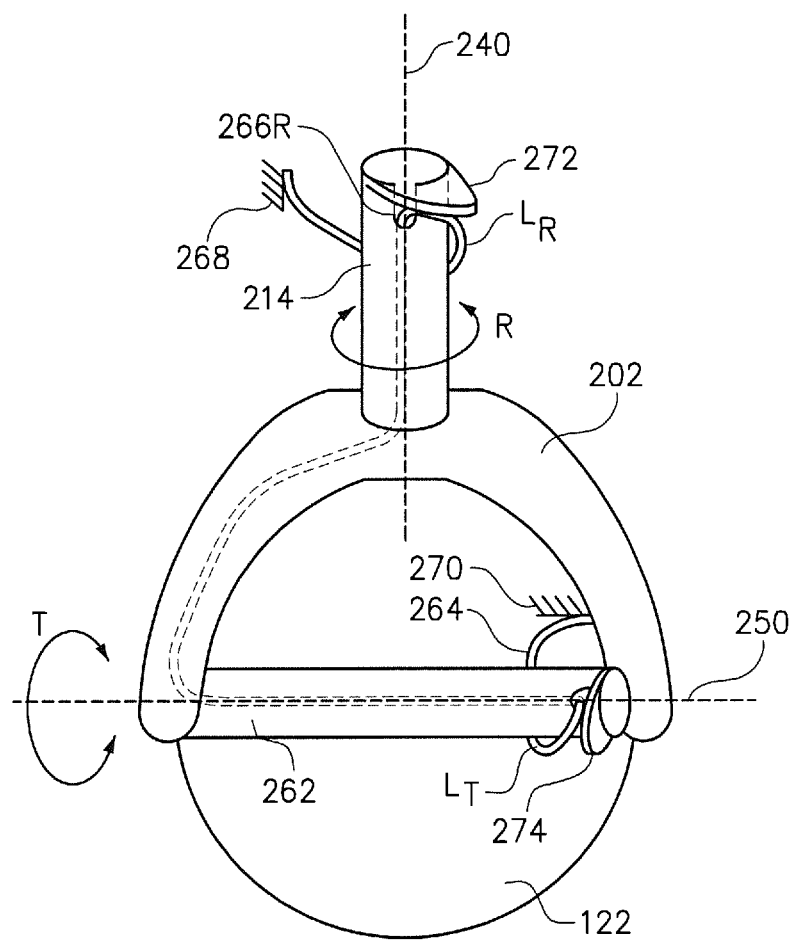
FIG. 3 is a schematic view showing a wiring arrangement for cables of the ball turret assembly.

FIG. 3 shows an embodiment of a wiring system for cable bundle 264 of ball turret assembly 118. Cable bundle 264 used to communicate video and possibly other signals, such as command, power, data and communications signals, to and from the interior of ball turret 122. In one embodiment, the cable bundle 264 includes six individual co-axial cables (not shown). The roll motion of roll drive shaft 214 is indicated by the double-headed arrow R. Also shown in FIG. 3 is the yoke 202 which supports ball turret 122 for rotation about tilt axis 250. Tilt shaft 262 is rigidly mounted relative yoke 202, and rotatably supports ball turret 122. In one embodiment, the range of rotation of ball turret 122 about tilt shaft 262 and tilt axis 250 is about 135 degrees.

As seen in FIG. 3, cable bundle 264 runs axially inside roll drive shaft 214 and tilt shaft 262. Notches $266_R$ and $266_T$ are provided at the ends of shafts 214 and 262, in communication with the shaft interiors, with the cable 264 passing through the notches to extend interiorly of the shafts. Notches $266_R$ and $266_T$ serve as exits ports and may instead take the form of holes drilled in the shafts to the interiors thereof. The cable bundle 264 is provided with strain relieving loops $L_R$ and $L_T$ at each of the exit points from the shafts 214 and 262, each loop containing enough slack to permit unfettered rotation about the axes 240 and 250 for the angle ranges recited above, without consuming too much of the limited room available, for example within ball turret 122 for loop $L_T$. A fixed point 268 relative to roll drive shaft 214 is shown, and this fixed point may be for example a portion of a housing, a printed circuit board, or other component, fixed relative to the fairing 126, to which the cable is secured. Similarly, a fixed point 270 relative to tilt shaft 262 is shown, said fixed point being a portion of the rotatable ball turret 122, for example the housing of the ball turret, or a printed circuit board or other component contained therein that is fixed relative to the ball turret. Cable bundle 264 is illustrated using a single line that is broken in portions thereof to indicate that the bundle passes interiorly of yoke 202, between the yoke and ball turret 122. However, this is not mandatory and the bundle 264 can instead pass exteriorly of yoke 202. In addition, while a single line is used to designate the cable bundle 264, it should be understood that some of the cables of the bundle may branch away from that line at any portion thereof, to connect to other components that are not shown.

Figure 4:
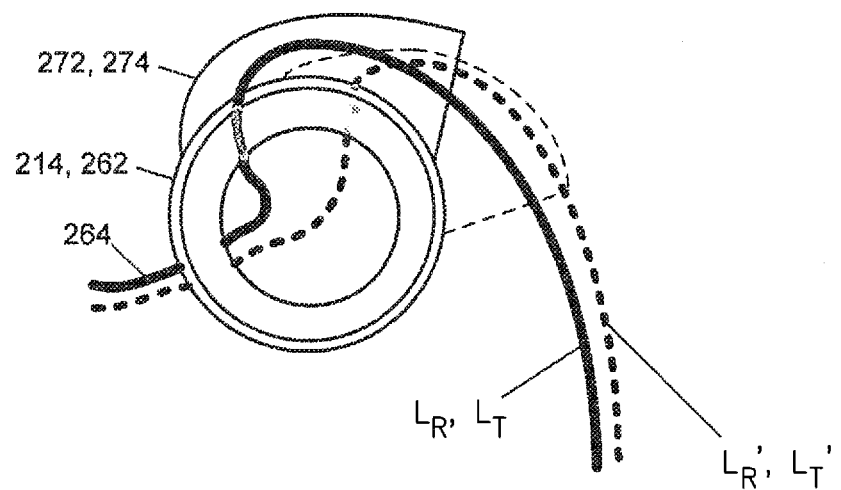
FIG. 4 is a schematic view showing extended and contracted cable arrangements.

Shafts 214 and 262 are provided with guides 272 and 274 operative to preserve the integrity of the loops $L_R$ and $L_T$, maintaining their positions and configurations relative to the corresponding shafts and to the notches $266_R$ and $266_T$ from whence the bundle 264 exits the shafts. In one embodiment, guides 272 and 274 are arcuate in shape and have an increasing radius from the center of the shaft, as best seen in FIG. 4, serving to conform and guide the loops throughout their range of contraction ($L_R$, $L_T$) and expansion ($L_R'$, $L_T'$) as the relative rotation about the roll and tilt axes 240 and 250 occurs. In another embodiment, guides 272 and 274 are of constant radius and serve to fix the cable bundle 264 around the respective shaft for a fixed length and then release it to coil/uncoil with shaft rotation. The use of the guides 272 and 274 reduces the deleterious effects of cycling the cable bundle 264 through the range of rotations of the shafts, controlling the take up and release of the slack in the bundle to minimize mechanical fatigue therein. The guides 272 and 274 also operate to provide strain relief and to diffuse bending forces, to which coaxial cables may be particularly sensitive. It should be noted that other shapes for the guides 272 and 274 are contemplated, and their increasing radii need not originate at the axes 240 and 250. Similarly, in one embodiment, only one of the guides 272 and 274 is utilized, the other being omitted.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A ball turret assembly for supporting a camera, comprising:
    a first shaft rotatable about a first axis relative to a first fixed point, the first shaft having an axially-extending interior region in communication with an exterior of the first shaft by way of a first exit port;
    a cable extending along the interior region of the first shaft and exiting the first shaft at the first exit port, the cable looping at least partially around the first shaft and affixed at the first fixed point, the cable loop contracting or expanding with rotation of the first shaft and
    a first guide for conforming and guiding the cable loop during said contracting or expanding, the first guide disposed at least partially circumferentially on the first shaft proximally to the first exit port.

2. The ball turret assembly of claim 1, wherein rotation of the first shaft imparts roll motion to the camera.

3. The ball turret assembly of claim 1, wherein the first shaft is configured to rotate less that 360 degrees.

4. The ball turret assembly of claim 3, further including a fairing into which the first shaft extends, the first fixed point being fixed relative to the fairing.

5. The ball turret assembly of claim 1, wherein the first shaft is configured to rotate about 270 degrees.

6. The ball turret assembly of claim 1, wherein rotation of the first shaft imparts tilt motion to the camera.

7. The ball turret assembly of claim 6, further including a ball turret housing the camera, the first shaft being rotatable relative to the ball turret, the first fixed point being fixed relative to the ball turret.

8. The ball turret assembly of claim 6, wherein the first shaft is configured to rotate less than 135 degrees.

9. The ball turret assembly of claim 1, further comprising:
    a second shaft rotatable about a second axis relative to a second fixed point, the second shaft having an axially-extending interior region in communication with an exterior of the second shaft by way of a second exit port; and
    a second guide disposed at least partially circumferentially on the second shaft proximally to the second exit port,
    wherein the cable extends along the interior region of the second shaft and exits the second shaft at the second exit port, the cable looping at least partially around the second shaft and affixed at the second fixed point.

10. The ball turret assembly of claim 9, further comprising a yoke supporting one of the shafts, the cable passing along an interior portion of the yoke.

* * * * *